United States Patent
Kabra et al.

(10) Patent No.: US 10,033,759 B1
(45) Date of Patent: Jul. 24, 2018

(54) SYSTEM AND METHOD OF THREAT DETECTION UNDER HYPERVISOR CONTROL

(71) Applicant: FireEye, Inc., Milpitas, CA (US)

(72) Inventors: Atul Kabra, Bangalore (IN); Julian Stecklina, Dresden (DE); Hirendra Rathor, Ashburn, VA (US); Udo Steinberg, Braunschweig (DE)

(73) Assignee: FireEye, Inc., Milpitas, CA (US)

( * ) Notice: Subject to any disclaimer, the term of this patent is extended or adjusted under 35 U.S.C. 154(b) by 232 days.

(21) Appl. No.: 15/197,634

(22) Filed: Jun. 29, 2016

Related U.S. Application Data

(60) Provisional application No. 62/233,977, filed on Sep. 28, 2015.

(51) Int. Cl.
*G06F 21/00* (2013.01)
*H04L 29/06* (2006.01)
(Continued)

(52) U.S. Cl.
CPC .......... *H04L 63/1466* (2013.01); *G06F 3/062* (2013.01); *G06F 3/064* (2013.01);
(Continued)

(58) Field of Classification Search
CPC ... H04L 63/1466; G06F 21/577; G06F 3/067; G06F 3/064; G06F 3/062; G06F 3/0664
See application file for complete search history.

(56) References Cited

U.S. PATENT DOCUMENTS

| 5,878,560 | A | 3/1999 | Johnson |
| 6,013,455 | A | 1/2000 | Bandman et al. |

(Continued)

FOREIGN PATENT DOCUMENTS

| WO | 2011/112348 A1 | 9/2011 |
| WO | 2012135192 A2 | 10/2012 |

(Continued)

OTHER PUBLICATIONS

U.S. Appl. No. 15/199,873, filed Jun. 30, 2016 Non-Final Office Action dated Feb. 9, 2018.

(Continued)

*Primary Examiner* — Lisa C Lewis
(74) *Attorney, Agent, or Firm* — Rutan & Tucker, LLP

(57) ABSTRACT

A computing device is described that comprises one or more hardware processors and a memory communicatively coupled to the one or more hardware processors. The memory comprises software that, when executed by the processors, operates as (i) a virtual machine and (ii) a hypervisor. The virtual machine includes a guest kernel that facilitates communications between a guest application being processed within the virtual machine and one or more virtual resources. The hypervisor configures a portion of the guest kernel to intercept a system call from the guest application and redirect information associated with the system call to the hypervisor. The hypervisor enables logic within the guest kernel to analyze information associated with the system call to determine whether the system call is associated with a malicious attack in response to the system call being initiated during a memory page execution cycle. Alternatively, the hypervisor operates to obfuscate interception of the system call in response to the system call being initiated during memory page read cycle.

20 Claims, 7 Drawing Sheets

(51) Int. Cl.
*G06F 3/06* (2006.01)
*G06F 21/57* (2013.01)

(52) U.S. Cl.
CPC ............ *G06F 3/067* (2013.01); *G06F 3/0664* (2013.01); *G06F 21/577* (2013.01)

(56) References Cited

U.S. PATENT DOCUMENTS

| | | |
|---|---|---|
| 7,424,745 B2 | 9/2008 | Theston et al. |
| 7,937,387 B2 | 5/2011 | Razier et al. |
| 7,958,558 B1 | 6/2011 | Eake et al. |
| 7,996,836 B1 | 8/2011 | McCorkendale et al. |
| 8,006,305 B2 | 8/2011 | Aziz |
| 8,010,667 B2 | 8/2011 | Zhang et al. |
| 8,069,484 B2 | 11/2011 | McMillan et al. |
| 8,151,263 B1 | 4/2012 | Venkitachalam et al. |
| 8,171,553 B2 | 5/2012 | Aziz et al. |
| 8,201,169 B2 | 6/2012 | Venkitachalam et al. |
| 8,204,984 B1 | 6/2012 | Aziz et al. |
| 8,233,882 B2 | 7/2012 | Rogel |
| 8,271,978 B2 | 9/2012 | Bennett et al. |
| 8,290,912 B1 | 10/2012 | Seads et al. |
| 8,291,499 B2 | 10/2012 | Aziz et al. |
| 8,332,571 B1 | 12/2012 | Edwards, Sr. |
| 8,353,031 B1 | 1/2013 | Rajan et al. |
| 8,375,444 B2 | 2/2013 | Aziz et al. |
| 8,387,046 B1 | 2/2013 | Montague et al. |
| 8,397,306 B1 | 3/2013 | Tormasov |
| 8,418,230 B1 | 4/2013 | Cornelius et al. |
| 8,479,276 B1 | 7/2013 | Vaystikh et al. |
| 8,479,294 B1 | 7/2013 | Li et al. |
| 8,510,827 B1 | 8/2013 | Leake et al. |
| 8,516,593 B1 | 8/2013 | Aziz |
| 8,522,236 B2 | 8/2013 | Zimmer et al. |
| 8,528,086 B1 | 9/2013 | Aziz |
| 8,539,582 B1 | 9/2013 | Aziz et al. |
| 8,549,638 B2 | 10/2013 | Aziz |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,584,239 B2 | 11/2013 | Aziz et al. |
| 8,635,696 B1 | 1/2014 | Aziz |
| 8,689,333 B2 | 4/2014 | Aziz |
| 8,713,681 B2 | 4/2014 | Silberman et al. |
| 8,756,696 B1 | 6/2014 | Miller |
| 8,775,715 B2 | 7/2014 | Tsirkin et al. |
| 8,776,180 B2 | 7/2014 | Kumar et al. |
| 8,776,229 B1 | 7/2014 | Aziz |
| 8,793,278 B2 | 7/2014 | Frazier et al. |
| 8,793,787 B2 | 7/2014 | Ismael et al. |
| 8,799,997 B2 | 8/2014 | Spiers et al. |
| 8,805,947 B1 | 8/2014 | Kuzkin et al. |
| 8,832,352 B2 | 9/2014 | Tsirkin et al. |
| 8,832,829 B2 | 9/2014 | Manni et al. |
| 8,839,245 B1 | 9/2014 | Khajuria et al. |
| 8,850,060 B1 | 9/2014 | Beloussov et al. |
| 8,850,571 B2 | 9/2014 | Staniford et al. |
| 8,863,279 B2 | 10/2014 | McDougal et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,910,238 B2 | 12/2014 | Lukacs et al. |
| 8,935,779 B2 | 1/2015 | Manni et al. |
| 8,949,257 B2 | 2/2015 | Shifter et al. |
| 8,984,478 B2 | 3/2015 | Epstein |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,003,402 B1 | 4/2015 | Carbone et al. |
| 9,009,822 B1 | 4/2015 | Ismael et al. |
| 9,009,823 B1 | 4/2015 | Ismael et al. |
| 9,027,125 B2 | 5/2015 | Kumar et al. |
| 9,027,135 B1 | 5/2015 | Aziz |
| 9,071,638 B1 | 6/2015 | Aziz et al. |
| 9,087,199 B2 | 7/2015 | Sallam |
| 9,092,616 B2 | 7/2015 | Kumar et al. |
| 9,092,625 B1 | 7/2015 | Kashyap et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,117,079 B1 | 8/2015 | Huang et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,213,651 B2 | 12/2015 | Malyugin et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Vlanni et al. |
| 9,355,247 B1 | 5/2016 | Thioux et al. |
| 9,356,944 B1 | 5/2016 | Aziz |
| 9,363,280 B1 | 6/2016 | Ivlin et al. |
| 9,367,681 B1 | 6/2016 | Smael et al. |
| 9,398,028 B1 | 7/2016 | Arandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1* | 6/2017 | Ha ................. G06F 21/566 |
| 9,690,933 B1 | 6/2017 | Singh et al. |
| 9,690,935 B2 | 6/2017 | Shifter et al. |
| 9,690,936 B1 | 6/2017 | Malik et al. |
| 9,736,179 B2 | 8/2017 | Ismael |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |

(56) References Cited

U.S. PATENT DOCUMENTS

| | | |
|---|---|---|
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 2006/0112416 A1 | 5/2006 | Ohta et al. |
| 2006/0130060 A1 | 6/2006 | Anderson et al. |
| 2006/0236127 A1 | 10/2006 | Kurien et al. |
| 2006/0248528 A1 | 11/2006 | Oney et al. |
| 2007/0006226 A1 | 1/2007 | Hendel |
| 2007/0250930 A1 | 10/2007 | Aziz et al. |
| 2007/0300227 A1 | 12/2007 | Mall et al. |
| 2008/0005782 A1 | 1/2008 | Aziz |
| 2008/0065854 A1 | 3/2008 | Schoenberg et al. |
| 2008/0123676 A1 | 5/2008 | Cummings et al. |
| 2008/0127348 A1 | 5/2008 | Largman et al. |
| 2008/0184367 A1 | 7/2008 | McMillan et al. |
| 2008/0184373 A1 | 7/2008 | Traut et al. |
| 2008/0235793 A1 | 9/2008 | Schunter et al. |
| 2008/0244569 A1 | 10/2008 | Challener et al. |
| 2008/0294808 A1 | 11/2008 | Mahalingam et al. |
| 2008/0320594 A1 | 12/2008 | Jiang |
| 2009/0007100 A1 | 1/2009 | Field et al. |
| 2009/0036111 A1 | 2/2009 | Danford et al. |
| 2009/0044024 A1 | 2/2009 | Oberheide et al. |
| 2009/0044274 A1 | 2/2009 | Budko et al. |
| 2009/0089860 A1 | 4/2009 | Forrester et al. |
| 2009/0106754 A1 | 4/2009 | Liu et al. |
| 2009/0113425 A1 | 4/2009 | Ports et al. |
| 2009/0158432 A1 | 6/2009 | Zheng et al. |
| 2009/0172661 A1 | 7/2009 | Zimmer et al. |
| 2009/0198651 A1 | 8/2009 | Shifter et al. |
| 2009/0198670 A1 | 8/2009 | Shifter et al. |
| 2009/0198689 A1 | 8/2009 | Frazier et al. |
| 2009/0199274 A1 | 8/2009 | Frazier et al. |
| 2009/0204964 A1 | 8/2009 | Foley et al. |
| 2009/0276771 A1 | 11/2009 | Nickolov et al. |
| 2009/0320011 A1 | 12/2009 | Chow et al. |
| 2009/0328221 A1 | 12/2009 | Blumfield et al. |
| 2010/0030996 A1 | 2/2010 | Butler, II |
| 2010/0031360 A1 | 2/2010 | Seshadri et al. |
| 2010/0043073 A1 | 2/2010 | Kuwamura |
| 2010/0100718 A1 | 4/2010 | Srinivasan |
| 2010/0115621 A1 | 5/2010 | Staniford et al. |
| 2010/0191888 A1 | 7/2010 | Serebrin et al. |
| 2010/0192223 A1 | 7/2010 | Ismael et al. |
| 2010/0235647 A1 | 9/2010 | Buer |
| 2010/0254622 A1 | 10/2010 | Kamay et al. |
| 2010/0299665 A1 | 11/2010 | Adams |
| 2010/0306173 A1 | 12/2010 | Frank |
| 2010/0306560 A1 | 12/2010 | Bozek et al. |
| 2011/0004935 A1 | 1/2011 | Moffie et al. |
| 2011/0022695 A1 | 1/2011 | Dalal et al. |
| 2011/0047542 A1 | 2/2011 | Dang et al. |
| 2011/0047544 A1 | 2/2011 | Yehuda et al. |
| 2011/0060947 A1 | 3/2011 | Song et al. |
| 2011/0078794 A1 | 3/2011 | Manni et al. |
| 2011/0078797 A1 | 3/2011 | Beachem et al. |
| 2011/0082962 A1 | 4/2011 | Horovitz et al. |
| 2011/0093951 A1 | 4/2011 | Aziz |
| 2011/0099633 A1 | 4/2011 | Aziz |
| 2011/0099635 A1 | 4/2011 | Silberman et al. |
| 2011/0153909 A1 | 6/2011 | Dong |
| 2011/0167422 A1 | 7/2011 | Eom et al. |
| 2011/0173213 A1 | 7/2011 | Frazier et al. |
| 2011/0219450 A1 | 9/2011 | McDougal et al. |
| 2011/0225624 A1 | 9/2011 | Sawhney et al. |
| 2011/0247072 A1 | 10/2011 | Staniford et al. |
| 2011/0296412 A1 | 12/2011 | Banga et al. |
| 2011/0296440 A1 | 12/2011 | Laurich et al. |
| 2011/0299413 A1 | 12/2011 | Chatwani et al. |
| 2011/0314546 A1 | 12/2011 | Aziz et al. |
| 2011/0321040 A1 | 12/2011 | Sobel et al. |
| 2011/0321165 A1 | 12/2011 | Capalik et al. |
| 2011/0321166 A1 | 12/2011 | Capalik et al. |
| 2012/0011508 A1 | 1/2012 | Ahmad |
| 2012/0047576 A1 | 2/2012 | Do et al. |
| 2012/0117652 A1 | 5/2012 | Manni et al. |
| 2012/0131156 A1 | 5/2012 | Brandt et al. |
| 2012/0144489 A1 | 6/2012 | Jarrett et al. |
| 2012/0159454 A1 | 6/2012 | Barham et al. |
| 2012/0174186 A1 | 7/2012 | Aziz et al. |
| 2012/0174218 A1 | 7/2012 | McCoy et al. |
| 2012/0198514 A1 | 8/2012 | McCune et al. |
| 2012/0216046 A1 | 8/2012 | McDougal et al. |
| 2012/0222114 A1 | 8/2012 | Shanbhogue |
| 2012/0222121 A1 | 8/2012 | Staniford et al. |
| 2012/0254995 A1 | 10/2012 | Sallam |
| 2012/0255002 A1 | 10/2012 | Sallam |
| 2012/0255003 A1 | 10/2012 | Sallam |
| 2012/0255012 A1 | 10/2012 | Sallam |
| 2012/0255015 A1 | 10/2012 | Sahita et al. |
| 2012/0255016 A1 | 10/2012 | Sallam |
| 2012/0255017 A1 | 10/2012 | Sallam |
| 2012/0255021 A1 | 10/2012 | Sallam |
| 2012/0260345 A1 | 10/2012 | Quinn et al. |
| 2012/0265976 A1 | 10/2012 | Spiers et al. |
| 2012/0291029 A1 | 11/2012 | Kidambi et al. |
| 2012/0297057 A1 | 11/2012 | Ghosh et al. |
| 2012/0311708 A1 | 12/2012 | Agarwal et al. |
| 2012/0317566 A1 | 12/2012 | Santos et al. |
| 2012/0331553 A1 | 12/2012 | Aziz et al. |
| 2013/0036470 A1 | 2/2013 | Zhu et al. |
| 2013/0036472 A1 | 2/2013 | Aziz |
| 2013/0047257 A1 | 2/2013 | Aziz |
| 2013/0055256 A1 | 2/2013 | Banga et al. |
| 2013/0086235 A1 | 4/2013 | Ferris |
| 2013/0086299 A1 | 4/2013 | Epstein |
| 2013/0091571 A1 | 4/2013 | Lu |
| 2013/0111593 A1 | 5/2013 | Shankar et al. |
| 2013/0117741 A1 | 5/2013 | Prabhakaran et al. |
| 2013/0117848 A1 | 5/2013 | Golshan et al. |
| 2013/0117849 A1 | 5/2013 | Golshan et al. |
| 2013/0179971 A1 | 7/2013 | Harrison |
| 2013/0191924 A1 | 7/2013 | Tedesco et al. |
| 2013/0227680 A1 | 8/2013 | Pavlyushchik |
| 2013/0227691 A1 | 8/2013 | Aziz et al. |
| 2013/0247186 A1 | 9/2013 | LeMasters |
| 2013/0282776 A1 | 10/2013 | Durrant et al. |
| 2013/0283370 A1 | 10/2013 | Vipat et al. |
| 2013/0291109 A1 | 10/2013 | Staniford et al. |
| 2013/0298243 A1 | 11/2013 | Kumar et al. |
| 2013/0298244 A1 | 11/2013 | Kumar et al. |
| 2013/0312098 A1 | 11/2013 | Kapoor et al. |
| 2013/0312099 A1 | 11/2013 | Edwards et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0326625 A1 | 12/2013 | Anderson et al. |
| 2013/0333033 A1 | 12/2013 | Khesin |
| 2013/0333040 A1 | 12/2013 | Diehl et al. |
| 2013/0347131 A1 | 12/2013 | Mooring et al. |
| 2014/0006734 A1 | 1/2014 | Li et al. |

(56) References Cited

U.S. PATENT DOCUMENTS

| | | |
|---|---|---|
| 2014/0019963 A1 | 1/2014 | Deng et al. |
| 2014/0032875 A1 | 1/2014 | Butler |
| 2014/0075522 A1 | 3/2014 | Paris et al. |
| 2014/0089266 A1 | 3/2014 | Une et al. |
| 2014/0096134 A1 | 4/2014 | Barak et al. |
| 2014/0115578 A1 | 4/2014 | Cooper et al. |
| 2014/0115652 A1 | 4/2014 | Kapoor et al. |
| 2014/0130158 A1 | 5/2014 | Wang et al. |
| 2014/0137180 A1 | 5/2014 | Lukacs et al. |
| 2014/0157407 A1 | 6/2014 | Krishnan et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0208123 A1 | 7/2014 | Roth et al. |
| 2014/0230024 A1 | 8/2014 | Uehara et al. |
| 2014/0237600 A1 | 8/2014 | Silberman et al. |
| 2014/0259169 A1 | 9/2014 | Harrison |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0289105 A1 | 9/2014 | Sirota et al. |
| 2014/0304819 A1 | 10/2014 | Ignatchenko et al. |
| 2014/0310810 A1 | 10/2014 | Brueckner et al. |
| 2014/0325644 A1 | 10/2014 | Oberg et al. |
| 2014/0337836 A1 | 11/2014 | Ismael |
| 2014/0344926 A1 | 11/2014 | Cunningham et al. |
| 2014/0351810 A1 | 11/2014 | Pratt et al. |
| 2014/0359239 A1 | 12/2014 | Hiremane et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0013008 A1 | 1/2015 | Lukacs et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0121135 A1* | 4/2015 | Pape .................. G06F 11/1484 714/15 |
| 2015/0128266 A1 | 5/2015 | Tosa |
| 2015/0172300 A1 | 6/2015 | Cochenour |
| 2015/0180886 A1 | 6/2015 | Staniford et al. |
| 2015/0186645 A1 | 7/2015 | Aziz et al. |
| 2015/0199514 A1 | 7/2015 | Tosa et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0244732 A1 | 8/2015 | Golshan et al. |
| 2015/0317495 A1 | 11/2015 | Rodgers et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0048680 A1 | 2/2016 | Lutas et al. |
| 2016/0057123 A1 | 2/2016 | Jiang et al. |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2016/0371105 A1* | 12/2016 | Sieffert .............. G06F 9/45545 |
| 2017/0083703 A1 | 3/2017 | Abbasi et al. |
| 2017/0213030 A1 | 7/2017 | Mooring et al. |
| 2017/0344496 A1* | 11/2017 | Chen .................. G06F 12/1408 |
| 2018/0013770 A1 | 1/2018 | Ismael |
| 2018/0048660 A1 | 2/2018 | Paithane et al. |

FOREIGN PATENT DOCUMENTS

| | | |
|---|---|---|
| WO | 2012154664 A2 | 11/2012 |
| WO | 2012177464 A1 | 12/2012 |
| WO | 2013/067505 A1 | 5/2013 |
| WO | 2013091221 A1 | 6/2013 |
| WO | 2014004747 A2 | 1/2014 |

OTHER PUBLICATIONS

U.S. Appl. No. 15/199,876, filed Jun. 30, 2016 Non-Final Office Action dated Jan. 10, 2018.

* cited by examiner

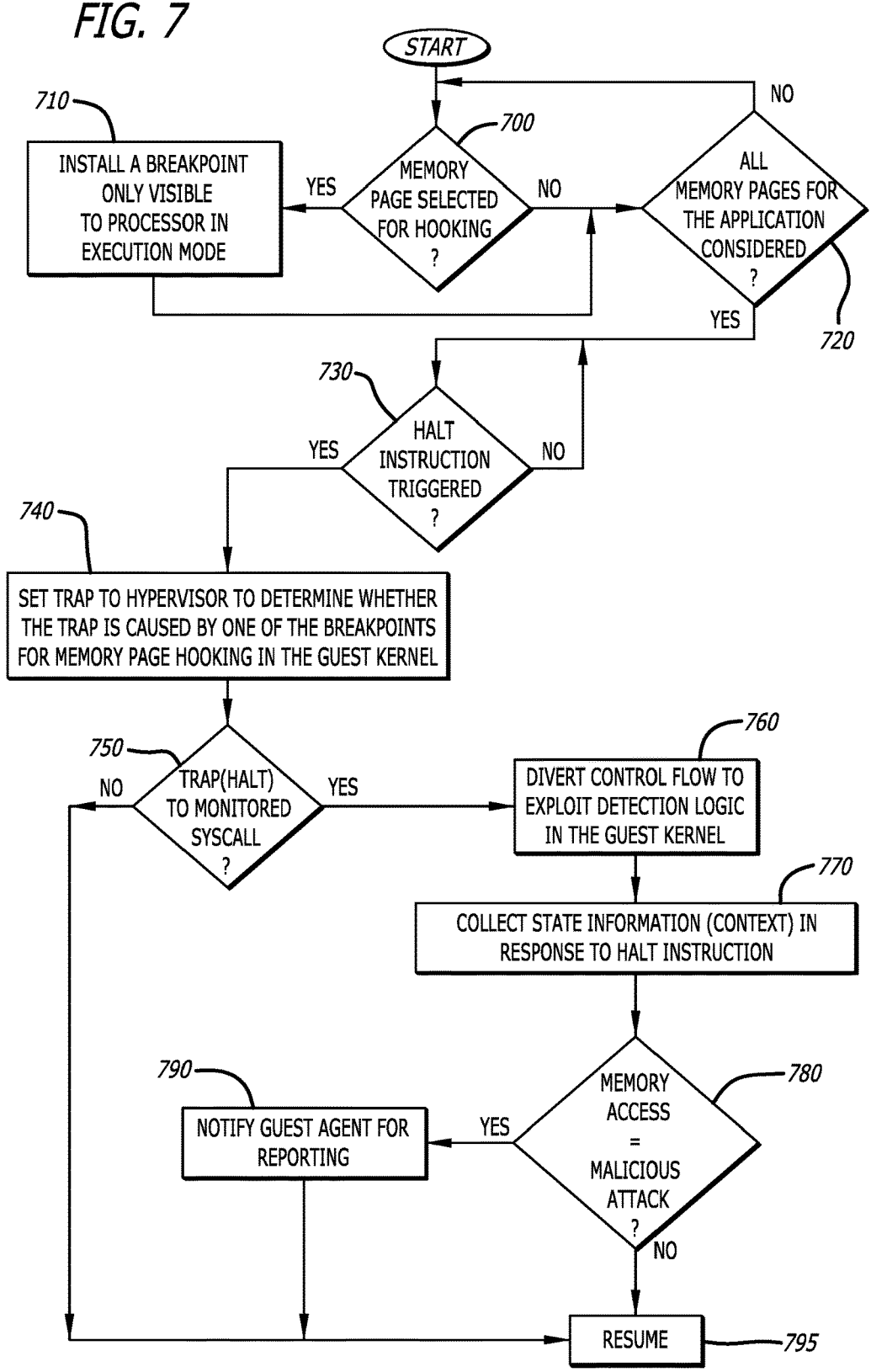

SYSTEM AND METHOD OF THREAT DETECTION UNDER HYPERVISOR CONTROL

CROSS-REFERENCE TO RELATED APPLICATIONS

This application claims the benefit of priority on U.S. Provisional Application No. 62/233,977 filed Sep. 28, 2015, the entire contents of which are incorporated by reference.

FIELD

Embodiments of the disclosure generally relate to the field of malware detection (e.g., exploit detection) through the hooking of system calls under hypervisor control.

GENERAL BACKGROUND

In general, virtualization is a technique that provides an ability to host two or more operating systems concurrently on the same computing device. Currently, virtualization architectures feature hardware virtualization capabilities that operate in accordance with two processor modes: host mode and guest mode. A virtual machine runs in guest mode, where a processor of the computing device switches from host mode to guest mode for execution of software components associated with the virtual machine (VM entry). Similarly, the processor may switch from guest mode to host mode when operations of the virtual machine are paused or stopped (VM exit).

A virtual machine (VM) is a software abstraction that operates like a physical (real) computing device having a particular guest operating system (OS). Each VM includes an operating system (OS) kernel (sometimes referred to as a "guest kernel") that operates in a most privileged guest mode (guest kernel mode, ring-0). A guest software application executes in a lesser privileged operating mode (guest user mode, ring-3).

As the guest software application executes and requires certain resources, the guest software application accesses an Application Programming Interface (API), which invokes a system call function (sometimes referred to as a "syscall") operating within the guest kernel. In response to the syscall, the guest kernel operates as a service provider by facilitating communications between the guest software application and one or more resources associated with the syscall. Examples of the resources may include, but are not limited or restricted to virtual resources, such as a particular virtual driver or certain virtual system hardware implemented by software components in a host space (e.g., virtual central processing unit "vCPU" or virtual disk) that are configured to operate in a similar manner as corresponding physical components (e.g., physical CPU or hard disk) or directly mapped to a physical resource. As a result, the guest system software, when executed, controls execution and allocation of virtual resources so that the VM operates in a manner consistent to operations of the physical computing device.

With the emergence of hardware support for full virtualization in an increased number of hardware processor architectures, new virtualization (software) architectures have emerged. One such virtualization architecture involves adding a software abstraction layer, sometimes referred to as a "virtualization layer," between the physical hardware and the virtual machine. The virtualization layer runs in host mode. It consists of an OS kernel (sometimes referred to as a "hypervisor") and multiple host applications that operate under the control of the OS kernel.

Conventionally, the detection of an exploit usually involves monitoring the usage of System APIs accessed by the guest software application operating with the virtual machine. This is achieved by intercepting (sometimes referred to as "hooking") an API call in the guest user mode prior to entry into the guest kernel mode. The analysis as to whether the API call is associated with a malicious attack may be conducted in the guest user mode, and thereafter, control may be transferred back to service the API function being called. However, there are exploits designed to detect an API hook, and in response, attempts to bypass the API hook by advancing a memory pointer directed to the "hooked" instruction associated with the API call a few bytes. The bypass attempt, referred to as "hook hopping," is an attempt by the exploit to execute the original API function.

Previously, to avoid hook hopping, efforts have been made to migrate exploit detection, one type of malware detection, into the guest kernel through a technique known as "kernel hooking". Kernel hooking is the process of modifying the guest OS kernel to alter its behavior or capture certain events. Previously, security vendors relied on kernel hooking to implement antivirus services, protecting the OS and its applications by intercepting and blocking potentially malicious actions or processes. However, in an attempt to strengthen protection of the guest kernel and combat the increased presence of rootkit attacks, some software companies modified their operating systems to monitor kernel code as well as system resources used by the guest kernel and initiate an automatic shutdown of the computing device upon detecting unauthorized kernel patching. One example of this modification is PatchGuard™ for Microsoft® Windows® operating systems.

While the prevention of kernel patching may have reduced some rootkit infections, it precludes security providers from providing more robust protection against malicious attacks to the guest kernel by handling exploit detection checks in the guest kernel.

BRIEF DESCRIPTION OF THE DRAWINGS

Embodiments of the disclosure are illustrated by way of example and not by way of limitation in the figures of the accompanying drawings, in which like references indicate similar elements and in which:

FIG. 7 is a flowchart of exemplary operations by the hypervisor-controlled threat detection system of FIGS. 4-6.

DETAILED DESCRIPTION

Figure 1:
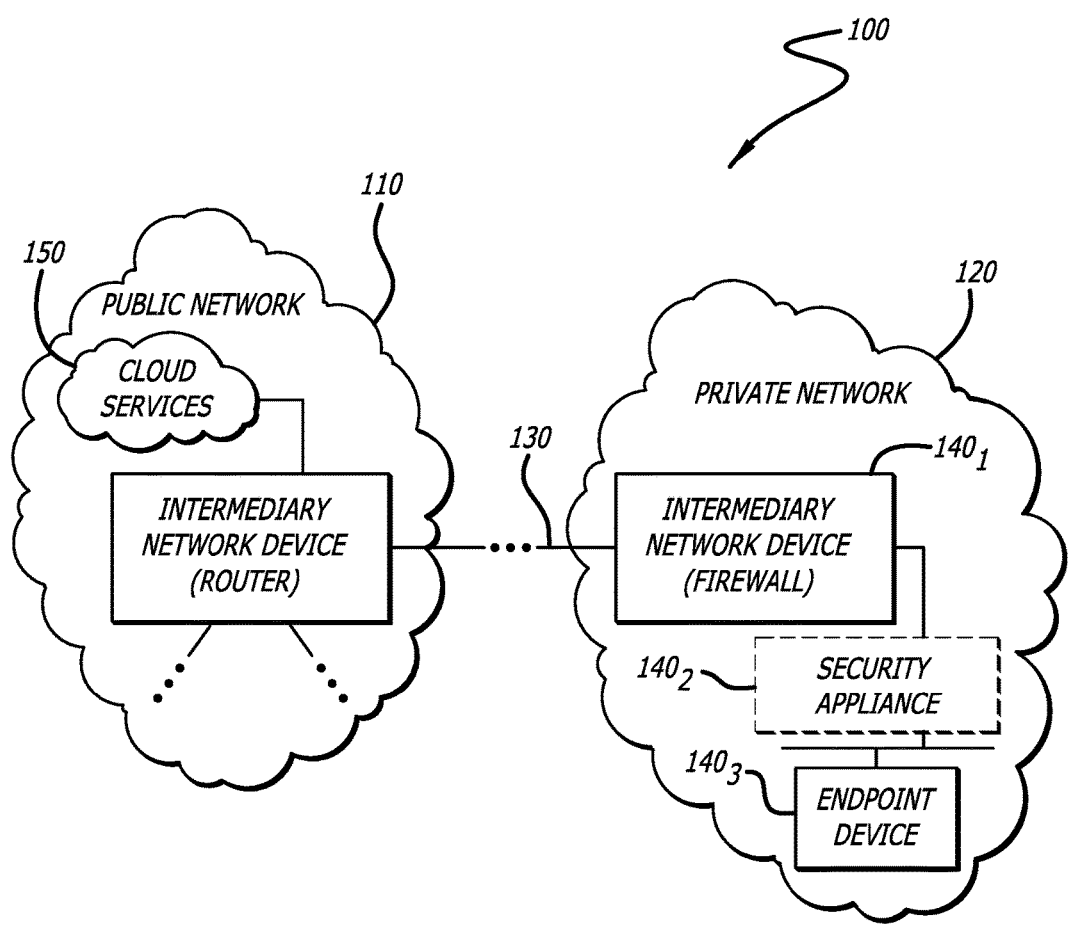
FIG. 1 is an exemplary block diagram of a network featuring a computing device that supports virtualization and is configured with a hypervisor-controlled threat detection system.

Various embodiments of the disclosure relates to logic operating in cooperation with a hypervisor to intercept and analyze a system call within a guest operating system (OS) kernel when the computing device is operating in a first (selected) operating state and to permit apparent uninterrupted access of a memory page normally accessed in response to that system call when the computing device is operating in a second (selected) operating state. The first selected operating state may be a guest "execute" cycle (e.g., instruction decode) and the second selected operating state may be a guest "read" cycle (e.g., instruction fetch).

More specifically, embodiments of the disclosure are directed to a hypervisor-controlled threat detection system that is deployed within a software virtualization architecture. The hypervisor-controlled threat detection system is configured, during run-time (e.g., a guest "execute" cycle) of a virtual machine operating in guest mode, to intercept a particular system call (sometimes referred to as a "hooked syscall") within a guest operating system (OS) kernel (hereinafter "guest kernel") and provide control to a hypervisor operating in host mode. According to one embodiment of the disclosure, the hooked syscall may be intercepted by inserting a breakpoint (e.g., a single byte instruction such as a HALT instruction) as the first instruction in code associated with the hooked syscall. The single byte instruction ensures that the instruction pointers for all threads during multi-thread operations being conducted on the computing device (e.g., endpoint device) will either be before or after the embedded instruction, not in the middle of the instructions which may occur with a multi-byte instruction. The code is maintained within a guest memory page, which may be referenced by use of a pointer corresponding to the hooked syscall that is placed within an entry of a service dispatch (syscall) table. The service dispatch table resides in the guest kernel.

In response to an Application Programming Interface (API) call that invokes the hooked syscall, the breakpoint (e.g., HALT instruction) causes a trap to the hypervisor at a desired address (or the hyper-process component operating in conjunction with the hypervisor). Thereafter, in response to receipt of the trap during run-time (e.g., guest "execute" cycle), the hypervisor subsequently diverts control to exploit detection logic residing within the guest kernel. This redirection maintains the "context" of the application executing in the guest user mode, enabling the exploit detection logic to access the metadata that may include some or all of the context. The context is the original state of the application prior to the trap and is preserved during re-direction to the exploit detection logic. Some of the context may be accessed dependent on the exploit detection intelligence. The exploit detection logic analyzes metadata, inclusive of at least some of the context information associated with the hooked syscall, to determine if the computing device may be subject to a malicious attack (e.g., exploit attack, malware attack, etc.).

However, during a second guest (read) cycle and in response to a read access that invokes the hooked syscall, the hypervisor does not divert control to the exploit detection logic. Rather, the hypervisor emulates a read access to the memory page in an unaltered state. This may be accomplished by the hypervisor returning an original first instruction of the hooked syscall that is overwritten by the breakpoint. Hence, during a (guest) read cycle, any guest application or guest OS functionality is unable to detect the presence of the breakpoint (e.g. HALT instruction) in code within the guest kernel since the control flow of the syscall during the (guest) read cycles continues as expected.

The "hooked" syscalls may be selected in accordance with exploit attack patterns that have been previously detected or syscall that are anticipated to be accessed during a malicious attack. It is contemplated that the selection of the hooked syscalls may be dynamically set or may be static in nature. When dynamically set, the hooked syscalls may be tailored to monitor syscalls that may be more frequently experienced by the computing device.

I. Terminology

In the following description, certain terminology is used to describe features of the invention. For example, in certain situations, the terms "component" and "logic" are representative of hardware, firmware or software that is configured to perform one or more functions. As hardware, a component (or logic) may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC", etc.), a semiconductor memory, or combinatorial elements.

A component (or logic) may be software in the form of a process or one or more software modules, such as executable code in the form of an executable application, an API, a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage. Upon execution of an instance of a system component or a software module, a "process" performs operations as coded by the software component.

The term "object" generally refers to a collection of data, whether in transit (e.g., over a network) or at rest (e.g., stored), often having a logical structure or organization that enables it to be categorized for purposes of analysis for a presence of an exploit and/or malware. During analysis, for example, the object may exhibit certain expected characteristics (e.g., expected internal content such as bit patterns, data structures, etc.) and, during processing, a set of expected behaviors. The object may also exhibit unexpected characteristics and a set of unexpected behaviors that may offer evidence of the presence of malware and potentially allow the object to be classified as part of a malicious attack.

Examples of objects may include one or more flows or a self-contained element within a flow itself. A "flow" generally refers to related packets that are received, transmitted, or exchanged within a communication session. For convenience, a packet is broadly referred to as a series of bits or bytes having a prescribed format, which may, according to one embodiment, include packets, frames, or cells. Further, an "object" may also refer to individual or a number of packets carrying related payloads, e.g., a single webpage received over a network. Moreover, an object may be a file retrieved from a storage location over an interconnect.

As a self-contained element, the object may be an executable (e.g., an application, program, segment of code, dynamically link library "DLL", etc.) or a non-executable. Examples of non-executables may include a document (e.g., a Portable Document Format "PDF" document, Microsoft® Office® document, Microsoft® Excel® spreadsheet, etc.), an electronic mail (email), downloaded web page, or the like.

The term "event" should be generally construed as an activity that is conducted by a software component process performed by the computing device. The event may occur that causes an undesired action to occur, such as overwriting a buffer, disabling a certain protective feature in the guest environment, or a guest OS anomaly such as a guest OS kernel trying to execute from a user page.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify or delete data. Malware may also correspond to an exploit, namely information (e.g., executable code, data, command(s), etc.) that attempts to take advantage of a vulnerability in software and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context.

The term "computing device" should be generally construed as electronics with the data processing capability and/or a capability of connecting to any type of network, such as a public network (e.g., Internet), a private network (e.g., a wireless data telecommunication network, a local area network "LAN", etc.), or a combination of networks. Examples of a computing device may include, but are not limited or restricted to, the following: an endpoint device (e.g., a laptop, a smartphone, a tablet, a desktop computer, a netbook, a medical device, or any general-purpose or special-purpose, user-controlled electronic device configured to support virtualization); a server; a mainframe; a router; or a security appliance that includes any system or subsystem configured to perform functions associated with malware detection and may be communicatively coupled to a network to intercept data routed to or from an endpoint device.

The term "message" generally refers to information transmitted in a prescribed format, where each message may be in the form of one or more packets or frames, a Hypertext Transfer Protocol (HTTP) based transmission, or any other series of bits having the prescribed format. For instance, a message may include an electronic message such as an electronic mail (email) message; a text message in accordance with a SMS-based or non-SMS based format; an instant message in accordance with Session Initiation Protocol (SIP); or a series of bits in accordance with another messaging protocol exchanged between software components or processes associated with these software components.

The term "trap," often also known as an exception or a fault, is typically a type of interrupt caused by an exceptional condition (e.g., breakpoint), resulting in a switch in control to the operating system to allow it to perform an action before returning control to the originating process. In some contexts, the trap refers specifically to an interrupt intended to initiate a context switch to a monitor program.

The term "interconnect" may be construed as a physical or logical communication path between two or more computing devices. For instance, the communication path may include wired and/or wireless transmission mediums. Examples of wired and/or wireless transmission mediums may include electrical wiring, optical fiber, cable, bus trace, a radio unit that supports radio frequency (RF) signaling, or any other wired/wireless signal transfer mechanism.

The term "computerized" generally represents that any corresponding operations are conducted by hardware in combination with software and/or firmware. Also, the term "agent" should be interpreted as a software component that instantiates a process running in a virtual machine. The agent may be instrumented into part of an operating system (e.g., guest OS) or part of an application (e.g., guest software application). The agent is configured to provide metadata to a portion of the virtualization layer, namely software that virtualizes certain functionality supported by the computing device.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General Network Architecture

Referring to FIG. 1, an exemplary block diagram of a network 100 is illustrated, which features a computing device that supports virtualization and is configured with a hypervisor-controlled threat detection system. The network 100 may be organized as a plurality of networks, such as a public network 110 and/or a private network 120 (e.g., an organization or enterprise network). According to this embodiment of network 100, the public network 110 and the private network 120 are communicatively coupled via network interconnects 130 and intermediary computing devices $140_1$, such as network switches, routers and/or one or more malware detection system (MDS) appliances (e.g., intermediary computing device $140_2$) as described in co-pending U.S. Patent Application entitled "Virtual System and Method For Securing External Network Connectivity" (U.S. Patent Application No. 62/187,108), the entire contents of which are incorporated herein by reference. The network interconnects 130 and the intermediary computing devices $140_1$ and/or $140_2$, inter alia, provide connectivity between the private network 120 and a computing device $140_3$, which may be operating as an endpoint device for example. According to one embodiment, the hypervisor-controlled threat detection system (described below) may be deployed within the computing device $140_3$. Alternatively, the hypervisor-controlled threat detection system may be deployed within the intermediary computing device $140_1$ as a component of the firewall, within the intermediary computing device $140_2$ operating as a security appliance, or as part of cloud services 150.

The computing devices $140_i$ (i=1, 2, 3) illustratively communicate by exchanging messages (e.g., packets or data in a prescribed format) according to a predefined set of protocols, such as the Transmission Control Protocol/Internet Protocol (TCP/IP). However, it should be noted that other protocols, such as the HyperText Transfer Protocol Secure (HTTPS) for example, may be used with the inventive aspects described herein. In the case of private network 120, the intermediary computing device $140_1$ may include a firewall or other computing device configured to limit or block certain network traffic in an attempt to protect the endpoint devices $140_3$ from unauthorized users.

III. General Endpoint Architecture

Figure 2:
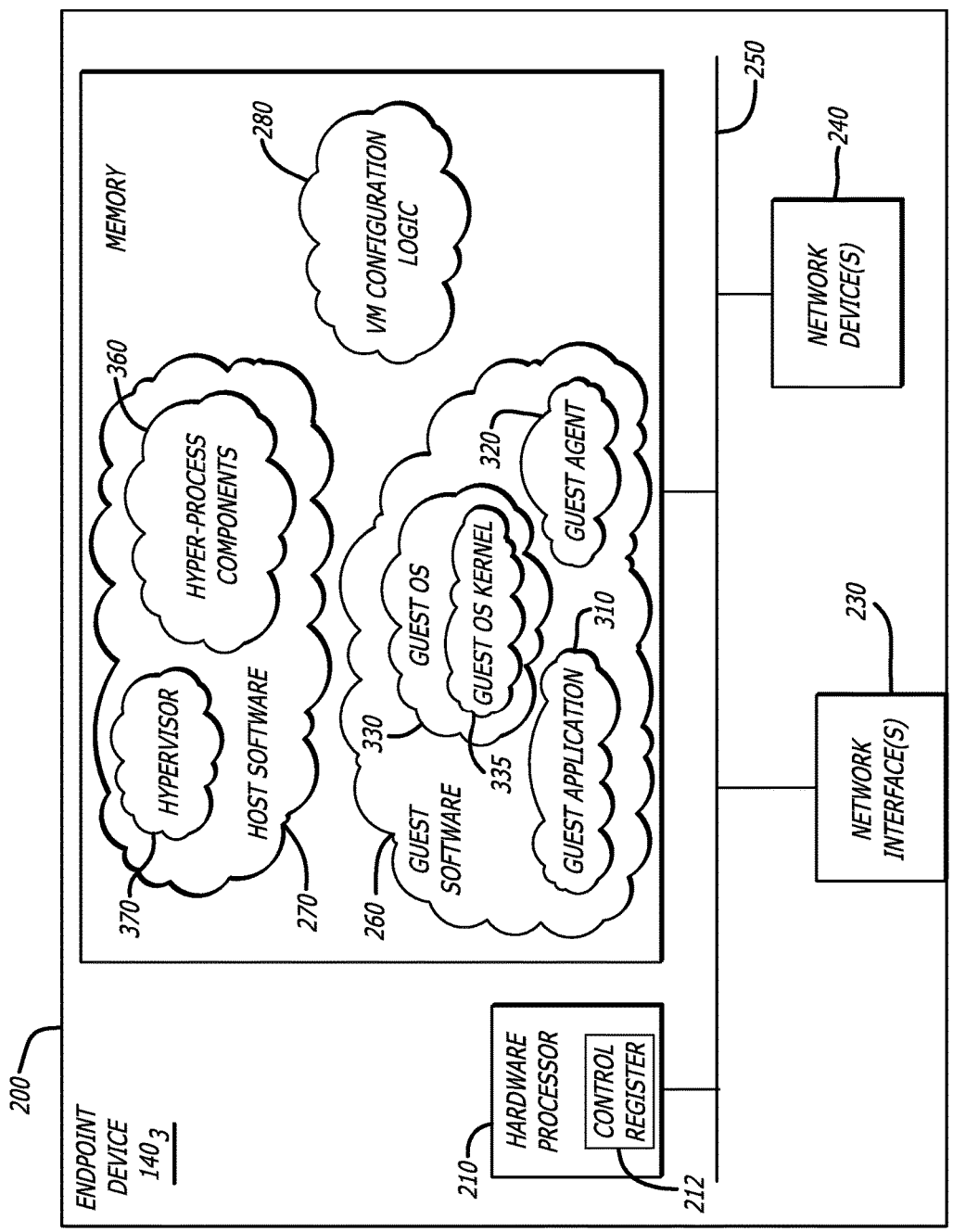
FIG. 2 is an exemplary block diagram of a logical representation of an endpoint device of FIG. 1 that is implemented with the hypervisor-controlled threat detection system is shown.

Referring now to FIG. 2, an exemplary block diagram of a logical representation of the endpoint device $140_3$ implemented with the hypervisor-controlled threat detection system is shown. Herein, the endpoint device $140_3$ illustratively includes one or more hardware processors 210, a memory 220, one or more network interfaces (referred to as "network interface(s)") 230, and one or more network devices (referred to as "network device(s)") 240 connected by a system interconnect 250, such as a bus. These components are at least partially encased in a housing 200, which is made entirely or partially of a rigid material (e.g., hardened plastic, metal, glass, composite, or any combination thereof) that protects these components from atmospheric conditions.

The hardware processor 210 is a multipurpose, programmable device that accepts digital data as input, processes the input data according to instructions stored in its memory, and provides results as output. One example of the hardware processor 210 may include an Intel® x86 central processing unit (CPU) with an instruction set architecture. Alternatively, the hardware processor 210 may include another type of CPU, a digital signal processor (DSP), an ASIC, a field programmable gate array (FPGA), or the like.

According to one implementation, the hardware processor 210 may include one or more control registers, including a "CR3" control register in accordance with x86 processor architectures. Herein, the control register 212 may be context-switched between host mode and guest mode, where a "guest read cycle" corresponds to a read operation that occurs when the hardware processor 210 is in guest mode and the "guest execute cycle" corresponds to an execute operation that occurs when the hardware processor 210 is in execute mode. Hence, when the hardware processor 210 is executing in guest mode, a pointer value within the control register 212 identifies an address location for guest memory page tables, namely memory page tables associated with a currently running process that is under control of the guest OS (e.g., WINDOWS®-based process). The address location may be for syscall function calls via the System Services Dispatch Table.

The network device(s) 240 may include various input/output (I/O) or peripheral devices, such as a storage device for example. One type of storage device may include a solid state drive (SSD) embodied as a flash storage device or other non-volatile, solid-state electronic device (e.g., drives based on storage class memory components). Another type of storage device may include a hard disk drive (HDD). Each network interface 230 may include a modem or one or more network ports containing the mechanical, electrical and/or signaling circuitry needed to connect the endpoint device $140_3$ to the private network 120 to thereby facilitate communications over the network 110. To that end, the network interface(s) 230 may be configured to transmit and/or receive messages using a variety of communication protocols including, inter alia, TCP/IP and HTTPS.

The memory 220 may include a plurality of locations that are addressable by the hardware processor 210 and the network interface(s) 230 for storing software (including software applications) and data structures associated with such software. Examples of the stored software include a guest software 260 and host software 270, as shown in FIG. 2. Collectively, these components may be operable within one or more virtual machines that are generated and configured by virtual machine (VM) configuration logic 280.

In general, the guest software 260 includes at least one guest application 310, a guest agent 320, and a guest OS 330, all of which may be operating as part of a virtual machine in a guest environment. Resident in memory 220 and executed by a virtual processor "vCPU" (which is, in effect, executed by processor(s) 210), the guest OS 330 functionally organizes the endpoint device $140_3$ by, inter alia, invoking operations in support of guest applications 310 executing on the endpoint device $140_3$. An exemplary guest OS 330 may include, but are not limited or restricted to the following: (1) a version of a WINDOWS® series of operating system; (2) a version of a MAC OS® or an IOS® series of operating system; (3) a version of a LINUX® operating system; or (4) a versions of an ANDROID® operating system, among others.

As described below in detail, the guest OS 330 further includes a guest OS kernel 335 that operates in cooperation with instance(s) of one or more guest applications 310 perhaps running their own separate guest address spaces and/or one or more instances of a guest agent 320 that may be instrumented as part of or for operation in conjunction with the guest OS 330 or as one of the separate guest applications 310. The guest agent 320 is adapted to monitor what processes are running in the guest user mode and provide information for selecting the "hooked" syscalls, namely the syscalls that are to be intercepted and monitored by the hypervisor. Additionally, the guest agent 320 is adapted to receive from the guest OS kernel 335 information associated with detected events that suggest a malicious attack, such as the presence of an exploit or malware in the computing device $140_3$. Examples of these guest applications 310 may include a web browser (e.g., EXPLORER®, CHROME®, FIREFOX®, etc.), document application such as a Portable Document Format (PDF) reader (e.g., ADOBE® READER®) or a data processing application such as the MICROSOFT® WORD® program from untrusted source(s).

Herein, the host software 270 may include hyper-process components 360, namely instances of user-space applications operating as user-level virtual machine monitors and in cooperation with a hypervisor 370 (described below). When executed, the hyper-process components 360 produce processes running in the host user mode. The hyper-process components 360 may be isolated from each other and run in separate (host) address spaces. In communication with a hypervisor 370 (described below), the hyper-process components 360 are responsible for controlling operability of the endpoint device $140_3$, including policy and resource allocation decisions, maintaining logs of monitored events for subsequent analysis, managing virtual machine (VM) execution, and managing exploit detection and classification. The management of exploit detection and classification may be accomplished through certain hyper-process components 360 (e.g., guest monitor and threat protection logic described below).

The hypervisor 370 is disposed or layered beneath the guest OS kernel 335 of the endpoint device 140$_3$ and is the only component that runs in the most privileged processor mode (host mode, ring-0). In some embodiments, as part of a trusted computing base of most components in the computing device, the hypervisor 370 is configured as a lightweight hypervisor (e.g., less than 10K lines of code), thereby avoiding inclusion of potentially exploitable x86 virtualization code.

The hypervisor 370 generally operates as the host kernel that is devoid of policy enforcement; rather, the hypervisor 370 provides a plurality of mechanisms that may be used by the hyper-processes, namely processes produced by execution of certain host software 280. These mechanisms may be configured to control communications between separate protection domains (e.g., between two different hyper-processes), coordinate thread processing within the hyper-processes and virtual CPU (vCPU) processing within a virtual machine, delegate and/or revoke hardware resources, and control interrupt delivery and Direct Memory Access (DMA), as described below.

IV. Virtualization Architecture—Threat Detection System

Figure 3:
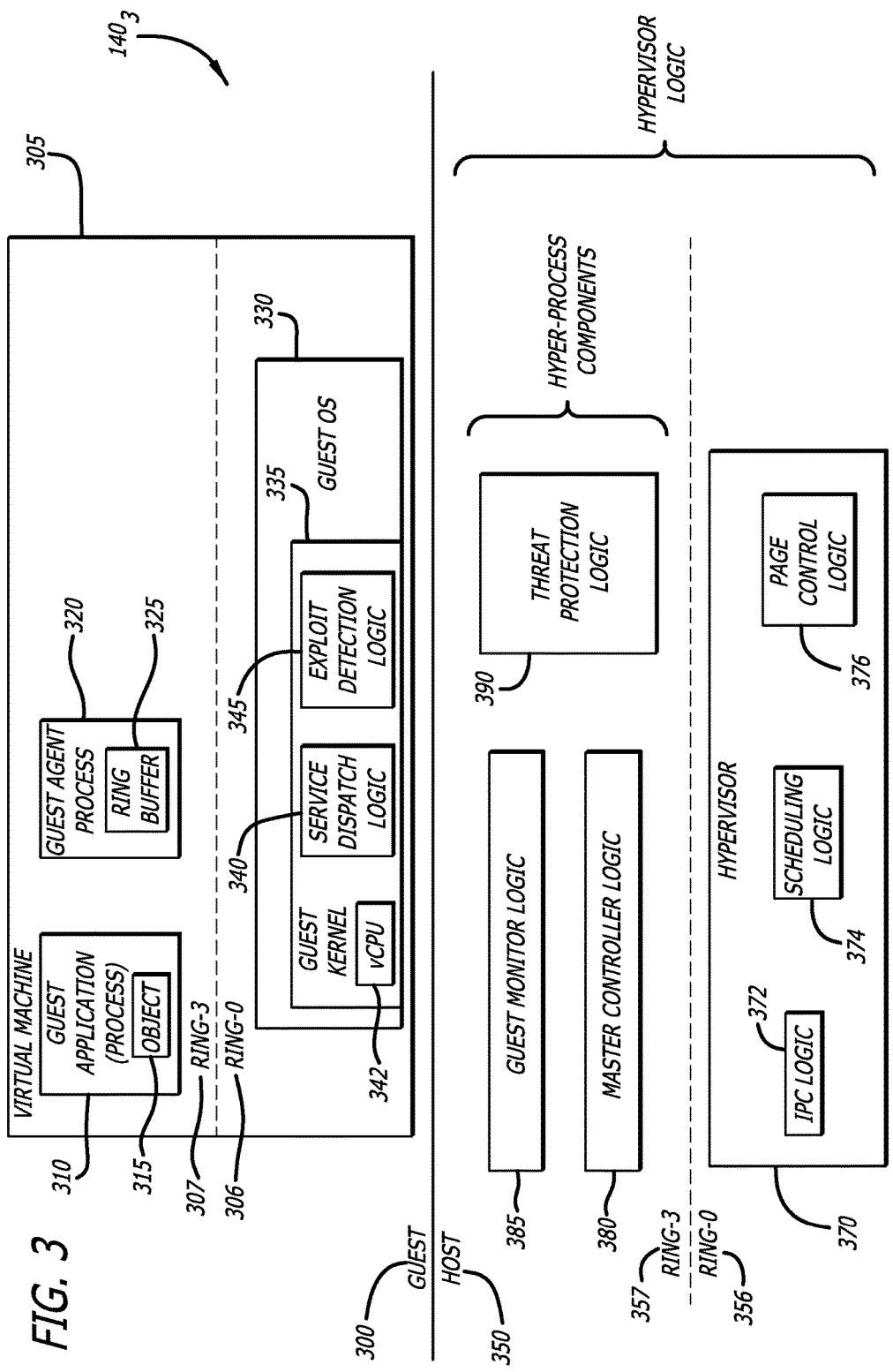
FIG. 3 is an exemplary embodiment of the software virtualization architecture of the endpoint device of FIG. 2 with the hypervisor-controlled threat detection system.

Referring now to FIG. 3, an exemplary embodiment of the software virtualization architecture of the endpoint device 140$_3$ with the hypervisor-controlled threat detection system 300. The software virtualization architecture includes a guest environment 300 and a host environment 350, both of which may be configured in accordance with a protection ring architecture as shown. While the protection ring architecture is shown for illustrative purposes, it is contemplated that other architectures that establish hierarchical privilege levels for virtualized software components may be utilized.

A. Guest Environment

The guest environment 300 includes a virtual machine 305, which includes software components that are configured to detect the presence of an exploit based on intercepting and analyzing syscalls within the guest kernel 335 while complying with OS functionality that precludes kernel hooking (e.g., PatchGuard® for Windows® OSes). Herein, as shown, the virtual machine 305 includes the guest OS 330 that features the guest OS kernel 335 running in the most privileged level (guest kernel mode, Ring-0 306) along with one or more instances of guest OS applications 310 running in a lesser privileged level (guest user mode, Ring-3 307).

1. Guest OS

In general, the guest OS 330 manages certain operability of the virtual machine 305, where some of these operations are directed to the execution and allocation of virtual resources, which may involve network connectivity, memory translation, interrupt service delivery and handling. More specifically, the guest OS 330 may receive electrical signaling from a process associated with the guest application 310 that requests a service from the guest kernel 335. The service may include hardware-related services (for example, accessing a hard disk drive), creation and execution of a new process, or the like. Application Programming Interfaces (APIs) provide an interface between the guest application 310 and the guest OS 330.

As an illustrative example, the request may include an API call, where a request for a service from the guest kernel 335 is routed to system service dispatch logic 340. Operating as a syscall table, the service dispatch logic 340 is configured to invoke a particular syscall that provides the service requested by the API call. For this embodiment, the service dispatch logic 340 includes a plurality of entries, where each entry includes an address pointer to a memory location (e.g., a memory page or a portion of a memory page) having code instructions for the corresponding syscall. It is contemplated that different syscall pointers may be directed to different memory pages, although two or more syscall pointers may be directed to the same memory page as the syscall pointers may be directed to different address regions of the same memory page. The portion of the memory page associated with the syscall includes instructions that may be used, at least in part, to cause virtual system hardware (e.g., vCPU 342) to provide the requested services, such as to access to virtual hard disk for example.

According to one embodiment of the disclosure, a breakpoint (e.g., HALT instruction) is inserted as a first instruction at a starting address location for one or more selected syscalls (sometimes referred to as "hooked syscalls"). This starting address location is referenced by a syscall pointer associated with the entry in the service dispatch logic 340 (syscall table) pertaining to the hooked syscall. In response to the API call invoking a particular syscall, the breakpoint causes a trap to the hypervisor 370 (described below) at a desired address. Thereafter, in response to receipt of the trap during run-time, the hypervisor 370 subsequently diverts control flow to exploit detection logic 345 within the guest kernel 335. The exploit detection logic 345 is configured to analyze metadata or other context information associated with the hooked syscall to detect a malicious attack.

2. Guest Agent

According to one embodiment of the disclosure, the guest agent 320 is a software component configured to provide the exploit detection logic 345 and/or a portion of the hypervisor logic (e.g., threat protection logic 390) with metadata that assists in determining the monitored syscalls. Instrumented in guest OS 330 or operating as a separate software component in the guest user mode 307 as shown, the guest agent 320 may be configured to provide metadata to the exploit detection logic 345 that identifies what syscalls are to be "hooked" for the current process running in the virtual machine 305. Stated differently, for a process being launched, the guest agent 320 identifies which syscalls are selected for insertion of a breakpoint (e.g., special instruction such as a HALT instruction) to redirect control flow to the exploit detection logic 345 operating within the guest kernel 335.

Herein, the guest agent 320 includes one or more ring buffers 325 (e.g., queue, FIFO, buffer, shared memory, and/or registers) to record the metadata used for syscall selection as well as information associated with certain characteristics determined by the exploit detection logic 345 that signify the object is an exploit or includes malware. Examples of these characteristics may include information associated with (i) type of syscall, (ii) what thread or process invoked the syscall, or (iii) was the API call that invoked the syscall coming from an allocated memory region, or the like. The recovery of the information associated with the characteristics may occur through a "pull" or "push" recovery scheme, where the guest agent 320 may be configured to download the characteristics periodically or aperiodically (e.g., when the ring buffer 325 exceeds a certain storage level or in response to a request from the exploit detection logic 345).

B. Host Environment

As further shown in FIG. 3, the host environment 350 features a protection ring architecture that is arranged with a privilege hierarchy from the most privileged level 356 (host kernel mode, Ring-0) to a lesser privilege level 357 (host user mode, Ring-3). Positioned at the most privileged level 356 (Ring-0), the hypervisor 370 is configured to directly interact with the physical hardware platform and its resources, such as hardware processor 210 or memory 220 of FIG. 2.

Running on top of the hypervisor 370 in Ring-3 357, a plurality of instances of certain host software (referred to as "hyper-process components 360") communicate with the hypervisor 370. Some of these hyper-process components 360 may include a master controller logic 380, a guest monitor logic 385 and a threat protection logic 390, each representing a separate software component with different functionality and its corresponding process may be running in a separate address space. As the software components associated with the hyper-process components 360 are isolated from each other (i.e. not in the same binary), inter-process communications between running instances of any of the hyper-process components 360 are handled by the hypervisor 370, but regulated through policy protection by the master controller logic 380.

1. Hypervisor

The hypervisor 370 may be configured as a light-weight hypervisor (e.g., less than 10K lines of code) that operates as a host OS kernel. The hypervisor 370 features logic (mechanisms) for controlling operability of the computing device, such as endpoint device $140_3$ as shown. The mechanisms include inter-process communication (IPC) logic 372, scheduling logic 374 and page control logic 376, as partially described in a U.S. Provisional Patent Application Nos. 62/097,485 & 62/187,108, the entire contents of both of which are incorporated herein by reference.

The hypervisor 370 features IPC logic 372, which supports communications between separate hyper-processes. Thus, under the control of the IPC logic 372, in order for a first hyper-process (e.g., guest monitor 385) to communicate with another hyper-process, the first hyper-process needs to route a message to the hypervisor 370. In response, the hypervisor 370 switches from the first hyper-process to a second hyper-process (e.g., threat protection logic 390) and copies the message from an address space associated with the first hyper-process to a different address space associated with the second hyper-process.

Also, the hypervisor 370 contains scheduling logic 374 that ensures, at some point in time, all of the software components can run on the hardware processor 210 as defined by the scheduling context. Also, the scheduling logic 374 re-enforces that no software component can monopolize the hardware processor 210 longer than defined by the scheduling context.

Lastly, the hypervisor 370 contains page control logic 376 that, operating in combination with the threat protection logic 390 (described below), is configured to set permissions for different guest memory pages based on information provided by the exploit detection logic 345. The page permissions may be set in order to control which syscalls are being monitored for the presence of exploits (or malware) through insertion of one or more breakpoints (e.g., special instruction such as a HALT instruction) into starting locations for the monitored syscalls (sometimes referred to as "hooked syscalls"). These starting locations may be, at least in part, correspond to the syscall pointers in the service dispatch logic 340 (syscall table) that pertain to the hooked syscall.

Figure 4:
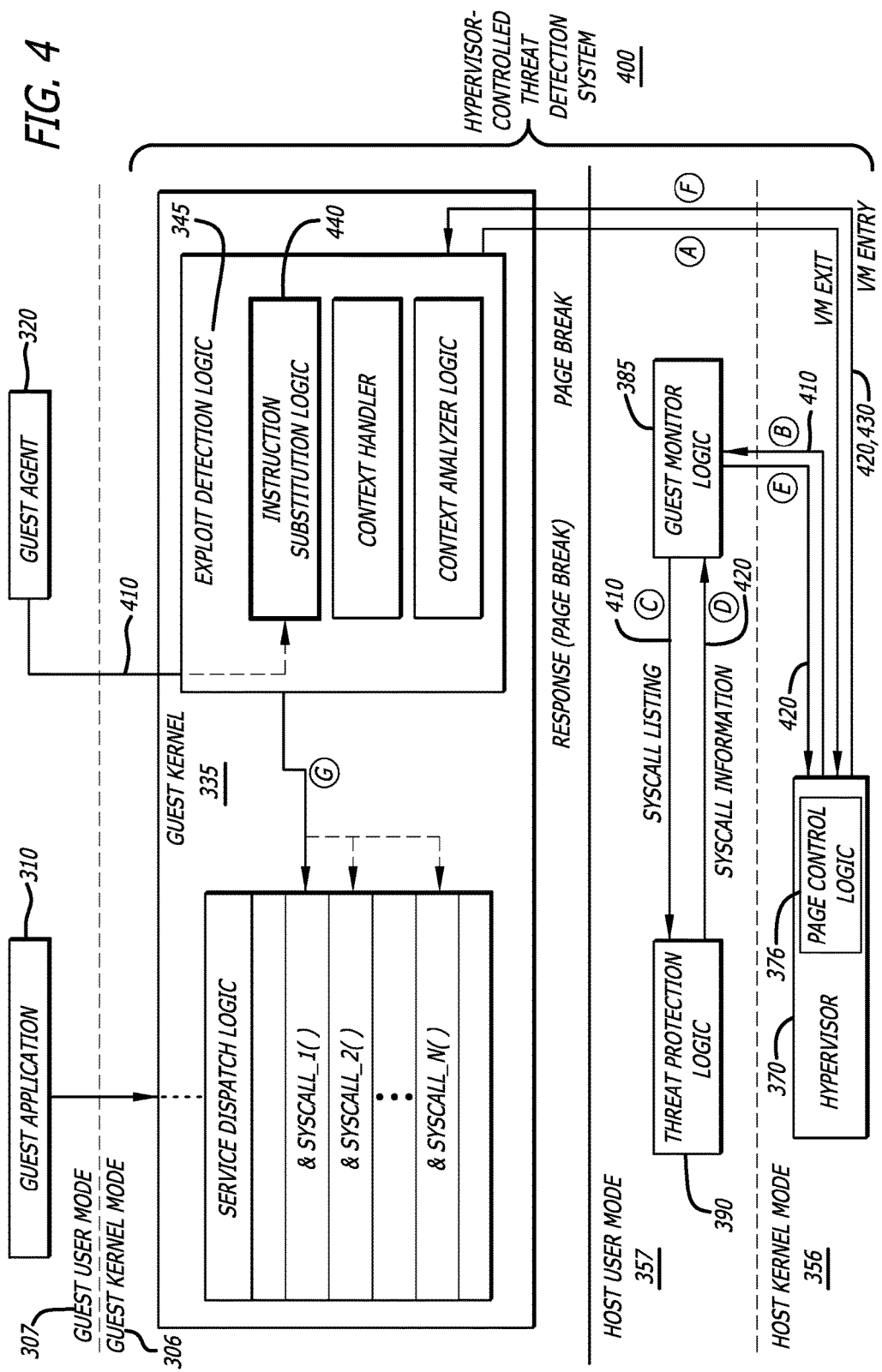
FIG. 4 is an exemplary block diagram of hypervisor-controlled syscall hooking conducted by the hypervisor-controlled threat detection system.

For instance, as an illustrative example as shown in FIGS. 3-4, for a given breakpoint at syscall_1( ) in the guest kernel 335, the hypervisor 370 makes the memory page containing syscall_1( ) execute-only and may assist in the creation of a copy of that memory page to emulate read accesses to that copied memory page. In the memory page with execute-only permission, the hypervisor 370 places a special instruction (e.g., HALT or another single byte instruction, a multi-byte instruction, etc.) that traps to the hypervisor 370 at a desired address. The original instruction byte substituted for the special instruction is stored at that address.

Where the guest application 310 executes an object 315 that issues an API call for services supported by syscall_1( ), the guest kernel 335 locates a function pointer within the service dispatch logic 340 to the syscall_1( ) function and invokes the syscall_1( ) function. A first instruction (HALT) in that function traps to the hypervisor 370. In response to detecting that the trap is a result of the first instruction, the hypervisor 370 diverts the control flow to the exploit detection logic 345 which performs the exploit detection checks. However, in response to an invocation of the syscall_1( ) function during a read access, the hypervisor 370 either directs the accessing source to the copy of the memory page or returns the original instruction that was overwritten by the breakpoint.

2. Master Controller

Referring still to FIG. 3, the master controller logic 380 is responsible for enforcing policy rules directed to operations of the software virtualization architecture. This responsibility is in contrast to the hypervisor 370, which provides mechanisms for inter-process communications and resource allocation, but has little or no responsibility in dictating how and when such functions occur. For instance, the master controller logic 380 may be configured to conduct a number of policy decisions, including some or all of the following: (1) memory allocation (e.g., distinct physical address space assigned to different software components); (2) execution time allotment (e.g., scheduling and duration of execution time allotted on a selected granular basis or process basis); (3) virtual machine creation (e.g., number of VMs, OS type, etc.); and/or (4) inter-process communications (e.g., which processes are permitted to communicate with which processes, etc.). Additionally, the master controller logic 380 is responsible for the allocation of resources, namely resources that are driven by hyper-process components 360.

3. Guest Monitor

Referring still to FIG. 3, the guest monitor logic 385 is a running instance of a host user space application that is responsible for managing the execution of the virtual machine 305, which includes operating in concert with the threat protection logic 390 to determine whether or not (i) certain breakpoints are to be applied to certain syscalls and (ii) to transfer of control flow to the exploit detection logic 345. Herein, an occurrence of the VM Exit may prompt the guest monitor logic 385 to receive and forward metadata associated with a process scheduled to run on the virtual machine to the threat protection logic 390. Based on the metadata, which may identify the next running process and one or more syscalls for hooking, the threat protection logic 390 signals the guest monitor logic 385 whether some of all of these syscalls are to be hooked. Such signaling may be based on analysis conducted by the threat protection logic 390, the hypervisor 370 or a combination thereof. Likewise, in response to a VM Entry, the guest monitor logic 385 may signal the exploit detection logic 345 that it now has control flow and to conduct the exploit detection checks to detect a malicious attack.

4. Threat Protection

As described above and shown in FIG. 3, the threat protection logic 390 operates in conjunction with the hypervisor 370 for selecting the "hooked" syscalls and diverting control flow to the exploit detection logic 345 operating within the guest kernel 335. More specifically, based on the type of process being launched (i.e., web browser version w.x, document reader version y.z), the threat protection logic 390 is responsible for selecting (or at least authorizing) the insertion of breakpoints within memory pages associated with the hooked syscall.

Thereafter, in response to a trap to the hypervisor 370 at a desired address, the threat protection logic 390 determines if the trap occurs during run-time (e.g., guest "execute" cycle) or during read-time (guest "read" cycle). In response to receipt of the trap during run-time, the threat protection logic 390, perhaps operating in conjunction with the hypervisor 370, determines that the trap is based on one of the inserted breakpoints and diverts control to exploit detection logic 345 residing within the guest kernel 335. The "hooked" syscall may be one of a plurality of syscalls selected in accordance with known or anticipated exploit attack patterns. It is contemplated that the selection of the hooked syscalls may be dynamically set or static in nature as described above.

V. Hypervisor-Controlled Threat Detection System

Referring now to FIG. 4, an exemplary block diagram of hypervisor-controlled syscall hooking by a hypervisor-controlled threat detection system 400 is shown. Herein, the hypervisor-controlled threat detection system 400 includes the exploit detection logic 345 residing within the guest kernel 335 and operating in concert with the hypervisor 370, the guest monitor logic 385, and the threat protection logic 390. When operating, the hypervisor-controlled threat detection system 400 resides in one of multiple operating states: (1) hypervisor-controlled syscall hooking (FIG. 4); (2) hypervisor-controlled syscall breakpoint handling (FIG. 5); and (3) exploit detection and reporting (FIG. 6).

As shown in FIG. 4, operating within the guest kernel 335, the exploit detection logic 345 includes instruction substitution logic 440 that is adapted to communicate with the guest agent 320 in order to receive a syscall listing 410 via an incoming message. Herein, according to one embodiment of the disclosure, the syscall listing 410 includes one or more syscalls that are targeted for monitoring and are independent of application type. Alternatively, according to another embodiment, the syscall listing 410 may comprise (1) identified application types for monitoring and (2) identified syscalls targeted for each identified application type. The targeted syscalls set forth in the syscall listing 410 may be selected based on machine learning gathered from prior analyses by the hypervisor-controlled threat detection system 400, or imported data from other computing devices or a third party source that monitors current trends for exploit or malware attacks in accordance with industry (e.g., financial, high technology, real estate, etc.), geographic region (e.g., country, state, county, city, principality, etc.), or the like.

In response to receiving the syscall listing 410, a virtual machine exit (VM Exit) occurs at which a transition is made between the virtual machine 305 that is currently running and the hypervisor 370 (operation A). In response to the VM Exit, certain guest state information is saved, such as processor state (e.g., control register values, etc.) for example. Also, the exploit detection logic 345 forwards the syscall listing 410 (or at least a portion thereof) within a message to the hypervisor 370.

Operating with the hypervisor 370, the threat protection logic 390 receives the syscall listing 410 from the hypervisor 370 (via the guest monitor logic 385) and determines if none, some or all of these syscalls are to be hooked by inserting a special instruction at a first instruction associated with the hooked syscall (operations B & C). This special instruction may be a single byte instruction (e.g., HALT instruction) or a multi-byte instruction (e.g., JUMP instruction), although the multi-byte instruction may cause device instability when the processing of the multi-byte instruction is interrupted. According to one embodiment of the disclosure, the threat protection logic 390 may rely on the identified application types received by the exploit detection logic 345 as part of the syscall listing 410.

Thereafter, the threat protection logic 390 provides a message including information associated with the selected syscall 420 (hereinafter "selected syscall information") to the hypervisor 370 via the guest monitor logic 385 (operations D & E). Based on the selected syscall information 420, the page control logic 376 of the hypervisor 370 determines an address location 430 for each memory page (or a region of the memory page) corresponding to the start of a selected syscall. In response to a change in operating state from the hypervisor 370 to the virtual machine 305, a VM Entry is triggered so that the guest state information is restored as the virtual machine 305 resumes operation (operation F). The exploit detection logic 345 receives via a message at least a portion of the selected syscall information 420 and the address information 430 from the hypervisor 370.

In response to receiving at least a portion of the selected syscall information 420 and the address information 430, the instruction substitution logic 440 accesses the service dispatch logic 340 to insert the special instruction into certain locations within memory pages associated with the syscalls confirmed by the threat protection logic 390 for hooking (operation G).

Figure 5:
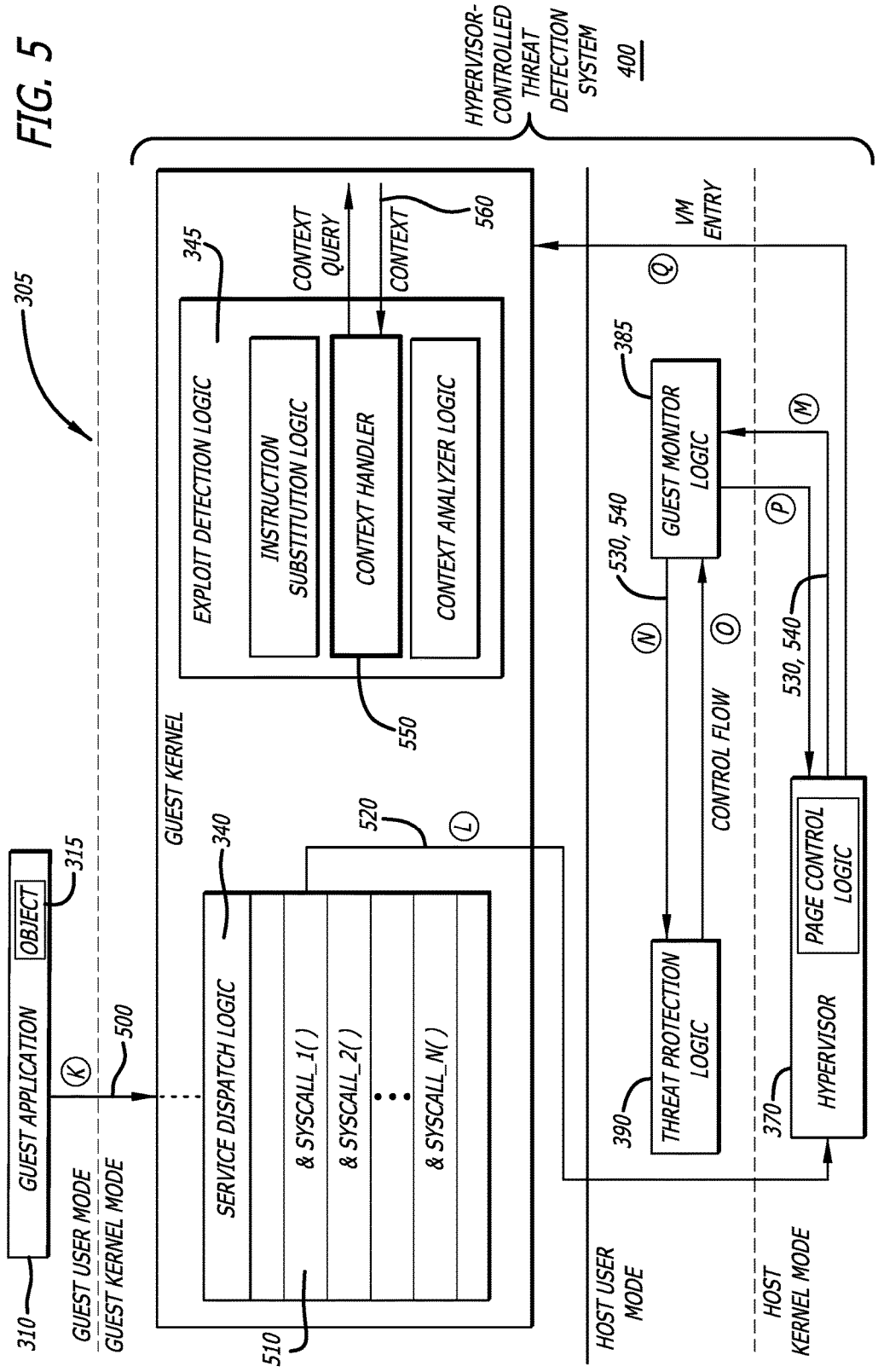
FIG. 5 is an exemplary block diagram of hypervisor-controlled syscall breakpoint handling by the hypervisor-controlled threat detection system.
Figure 6:
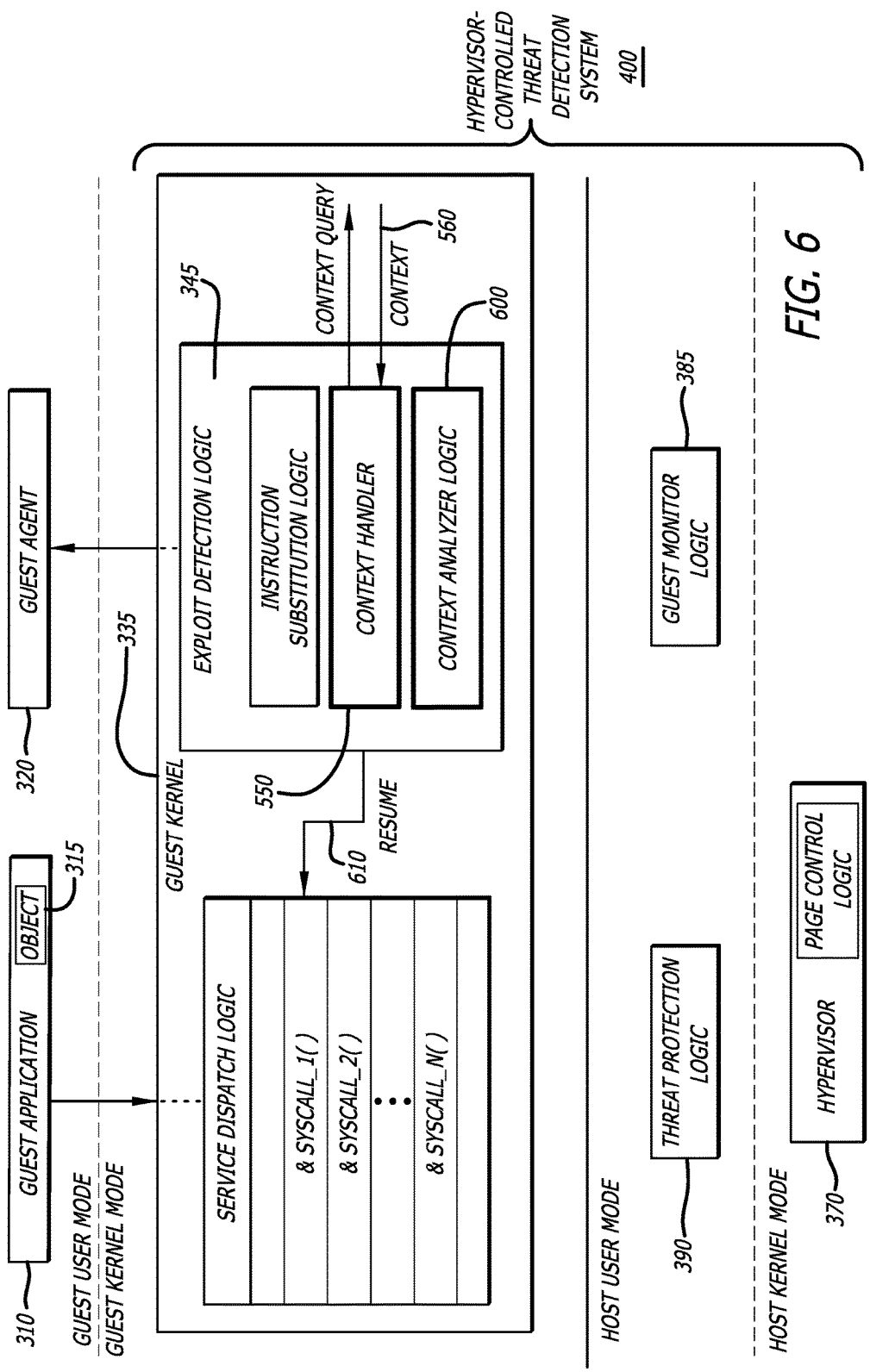
FIG. 6 is an exemplary block diagram of exploit detection and reporting by the hypervisor-controlled threat detection system.

Referring now to FIG. 5, an exemplary block diagram of hypervisor-controlled syscall breakpoint handling by the hypervisor-controlled threat detection system 400 is shown. Herein, the guest application 310 is processing an object 315 that initiates a request message 500 for kernel services (e.g., disk access, create new process, etc.) that accesses the service dispatch logic 340 (operation K). When the kernel services request message 500 is associated with a hooked syscall (e.g., syscall_1( ) 510), an embedded breakpoint (e.g., HALT instruction) causes a trap 520 to the hypervisor 370 at a desired address (operation L). The trap 520 may operate as a VM Exit as a transition is being made between the virtual machine 305 and the hypervisor 370. Also, an identifier 530 of the guest application 310 (hereinafter "guest_app_ID 530") that initiated the request message 500 along with an identifier of hooked syscall (hereinafter "hooked_syscall_ID" 540) are provided to the hypervisor 370.

Operating with the hypervisor 370, the threat protection logic 390 receives the guest_app_ID 530 along with the hooked_syscall_ID 540 (via a message received from the guest monitor logic 385) with optionally guest application state (e.g. execute cycle, read cycle, etc.) if not immediately available to the threat protection logic 390. This information is provided to the threat protection logic 390 for analysis. If the threat protection logic 390 determines that the guest_app_ID 530 matches one of the identified application types for monitoring included as part of the syscall listing 410 of FIG. 4, but the requesting source is operating in a "guest" read cycle, the hypervisor 370 returns an original first instruction of the "hooked" syscall that is overwritten by the breakpoint so that no guest application or guest OS functionality is able to detect the presence of the breakpoint.

However, if the operating state is in execute mode, the threat protection logic 390 determines that the guest_app_ID 530 matches one of the identified application types for monitoring included as part of the syscall listing 410 of FIG. 4 (operations M & N), the threat protection logic 390 signals the hypervisor 370 via the guest monitor logic 385 to divert the control flow to exploit detection logic 345 residing within the guest kernel 335 and a VM Entry occurs to restore the guest state information and resume VM operations (operations O, P & Q). The hypervisor 370 may divert the control flow by modifying an address in an instruction pointer of the vCPU 342 of FIG. 3 to point to a memory address associated with the exploit detection logic 345, namely a memory address of context handler logic 550 that is part of the exploit detection logic 345. The guest_app_ID 530 and the hooked_syscall_ID 540 are provided to the context handler 550, which is adapted to retrieve context information 560, including a memory region from which the API call that invokes syscall_1( ) identified by the hooked_syscall_ID 540 or other characteristics that may be useful in determining whether an exploit attack is being conducted.

Referring to FIG. 6, an exemplary block diagram of exploit detection and reporting by the hypervisor-controlled threat detection system 400 is shown. Herein, the context handler 550 of the exploit detection logic 345 fetches context information associated with the hooked syscall (syscall_1) for the context analyzer logic 600 to determine if the computing device may be subject to a malicious attack. For instance, where the object 315 is an executable, the context analyzer logic 600 may conduct heuristic analysis of certain context information 560, such as the memory region associated with the object 315 that issues the API call. Where the memory region corresponds to a data section of the executable object 315, the context analyzer logic 600 identifies that the object 315 is associated with a malicious attack and information is sent to the guest agent 320 that reports (though a formatted message) that the object 315 includes a potential exploit. In contrast, where the memory region corresponds to a code section associated with the executable object 315, the context analyzer logic 600 identifies that the object 315 is not associated with a malicious attack. As a result, the exploit detection logic 345 may refrain from sending information to the guest agent 320 that identifies a low probability of the object 315 including a potential exploit. During exploit detection checks or subsequent thereto, the exploit detection logic 345 may resume operations 610, which may include returning the original instruction swapped out for the HALT instruction and allowing the guest kernel 335 to acquire the virtual resources requested by the guest application 310 as processing of the object 315 continues.

Referring to FIG. 7, a flowchart of exemplary operations of the hypervisor-controlled threat detection system is shown. First, a determination is made as to whether any memory pages associated with syscalls operating within the guest kernel are to be monitored (block 700). If so, such monitoring may be conducted by installing a breakpoint (e.g., a single-byte instructions such as a HALT instruction) as the first instruction at a particular address location where the syscall code resides, namely an address for the portion of the memory page that includes the syscall code for example (block 710). Herein, the breakpoint is only visible to the processor during the (guest) execute cycle. During the (guest) read cycle, however, the hypervisor is configured to hide the HALT instruction by returning the first instruction, namely the original instruction that was substituted for the HALT instruction. This hypervisor-controlled syscall hooking process is iterative until all of the breakpoints are installed into each of the syscalls (block 720).

Thereafter, the hypervisor-controlled threat detection system conducts a hypervisor-controlled syscall hooking process that initially determines whether a HALT instruction has been triggered (block 730). If not, the hypervisor-controlled threat detection system continues to monitor for the execution of a HALT instruction. If so, the HALT instruction causes a trap to the hypervisor at a desired address (block 740). Thereafter, in response to receipt of the trap during run-time and the HALT instruction is directed to one of the applications being monitored, the hypervisor subsequently diverts control flow to the exploit detection logic residing within the guest kernel (blocks 750 and 760). The exploit detection logic obtains and analyzes metadata or other context information associated with the hooked syscall to determine if the object being processed by the guest application is a potential exploit (blocks 770 and 780). One factor in the determination is whether the object (executable), which initiated an API call (which resulted in the syscall), resides in a code section or a data portion. If the later, the object is a potential exploit.

If the object is determined to be a potential exploit, the exploit detection logic notifies the guest agent by providing characteristics supporting a determination that the object is associated with a potential exploit and the virtual machine operations resume (blocks 790 and 795). Otherwise, no reporting may be conducted, but rather, the virtual machine resumes (block 795).

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computing device comprising:
one or more hardware processors; and
a memory coupled to the one or more processors, the memory comprises software that, when executed by the one or more hardware processors, operates as (i) a virtual machine including a guest kernel that facilitates communications between a guest application being processed within the virtual machine and one or more resources and (ii) a hypervisor configured to intercept a system call issued from the guest application,
wherein the hypervisor is configured to signal logic within the guest kernel to analyze information associated with the intercepted system call to determine whether the intercepted system call is associated with a malicious attack in response to the intercepted system call occurring during a first operating state,
wherein the hypervisor is further configured to obfuscate interception of the system call in response to the intercepted system call being issued during a second operating state,
wherein the first operating state is a first guest cycle and the second operating state is a second guest cycle.

2. The computing device of claim 1, wherein the first guest cycle is a guest execute cycle.

3. The computing device of claim 2, wherein the second guest cycle is a guest read cycle.

4. The computing device of claim 1, wherein the hypervisor is further configured to obfuscate interception of the system call by re-inserting an original first instruction of the system call, which has been previously overwritten by a particular instruction that diverts control to the hypervisor, so that no guest application or guest operating system functionality is able to detect presence of the particular instruction.

5. The computing device of claim 4, wherein the particular instruction is a HALT instruction.

6. The computing device of claim 1, wherein a portion of the guest kernel includes a service dispatch table.

7. The computing device of claim 6, wherein the hypervisor is configured to intercept the system call by inserting a single-byte instruction as a first instruction in code associated with the system call that is accessed via a pointer in the service dispatch table corresponding to the system call.

8. The computing device of claim 7, wherein the hypervisor is configured to intercept the system call by processing the single-byte instruction which is a HALT instruction that causes a trap to the hypervisor, the trap includes at least an identifier of the guest application that issued the system call and an identifier of the system call.

9. The computing device of claim 8, wherein the memory further comprises threat protection logic that, when executed by the one or more hardware processors, determines whether the guest application is a type of application being monitored and signals the hypervisor to divert operation control to the logic operating within the guest kernel in response to detecting that the system call is initiated during the first operating state.

10. The computing device of claim 9, wherein the logic operating within the guest kernel comprises an exploit detection logic that fetches context information associated with the intercepted system call, when the intercepted system call was issued by an object being processed by the guest application and that conducts a heuristic analysis of the context information to determine whether the object that issued the system call resides in a code section or a data portion.

11. A computerized method comprising:
intercepting, using a hypervisor, a system call issued from an object being processed by a guest application operating within a virtual machine, the virtual machine including a guest kernel that facilitates communications between the guest application and one or more resources within the virtual machine;
responsive to the intercepted system call occurring during a first operating state, signaling logic with the guest kernel to analyze information associated with the intercepted system call to determine whether the intercepted system call is associated with a malicious attack; and
responsive to the intercepted system call occurring during a second operating state different than the first operating state, obfuscating interception of the system call, wherein the first operating state is a first guest cycle and the second operating state is a second guest cycle.

12. The computerized method of claim 11, wherein the first guest cycle is a guest execute cycle and the second guest cycle is a guest read cycle.

13. The computerized method of claim 12, wherein the obfuscating interception of the system call comprises re-inserting an original first instruction associated with the system call, which has been previously overwritten by a particular instruction that diverts control to the hypervisor, so that no guest application or guest operating system functionality is able to detect a presence of the particular instruction.

14. The computerized method of claim 13, wherein the particular instruction is a HALT instruction.

15. The computerized method of claim 11, wherein intercepting the system call comprises inserting a single-byte instruction as a first instruction in stored code associated with the system call that, when accessed, causes a trap to the hypervisor.

16. The computerized method of claim 15, wherein the single-byte instruction includes a HALT instruction and the trap includes at least an identifier of the guest application running the object that issued the system call and an identifier of the system call.

17. The computerized method of claim 16, wherein prior to signaling the logic within the guest kernel to analyze information associated with the intercepted system call to determine whether the intercepted system call is associated with a malicious attack, the computerized method further comprises determining whether the guest application is a particular type of application that is to be monitored and signaling a hypervisor to divert operation control to the logic operating within the guest kernel in response to detecting that the system call is issued during the first operating state.

18. A computing device comprising:
a virtual machine including a guest kernel that facilitates communications between a guest application being processed within the virtual machine and one or more resources; and
a hypervisor communicatively coupled to the virtual machine, the hypervisor being configured to receive an intercepted system call initiated by an object being processed within the guest application within the virtual machine, the intercepted system call being directed to a memory page in an altered state with a first instruction of the memory page being substituted with a HALT instruction to trap to the hypervisor,
wherein the hypervisor (i) signals logic within the guest kernel to analyze information associated with the intercepted system call to determine whether the intercepted system call is associated with a malicious attack in response to the intercepted system call occurring during a first operating state and (ii) obfuscates interception of the system call by emulating a read access to the memory page in an unaltered state in response to the intercepted system call occurring during a second operating state different than the first operating state,
wherein the first operating state is a first guest cycle and the second operating state is a second guest cycle.

19. The computing device of claim 18, wherein the first guest cycle is a guest execute cycle.

20. The computing device of claim 19, wherein the second guest cycle is a guest read cycle.

* * * * *